Aug. 7, 1956  R. H. LONG  2,757,551
TRANSMISSION CONTROL AND SWITCH MECHANISM THEREFOR
Filed March 19, 1954  3 Sheets-Sheet 1

INVENTOR.
RICHARD H. LONG
BY
H. O. Clayton
ATTORNEY

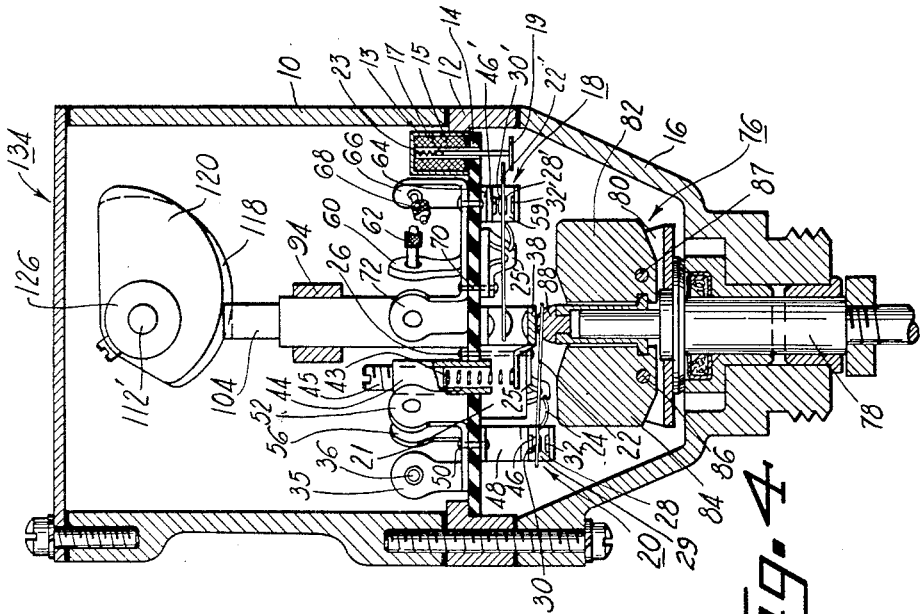
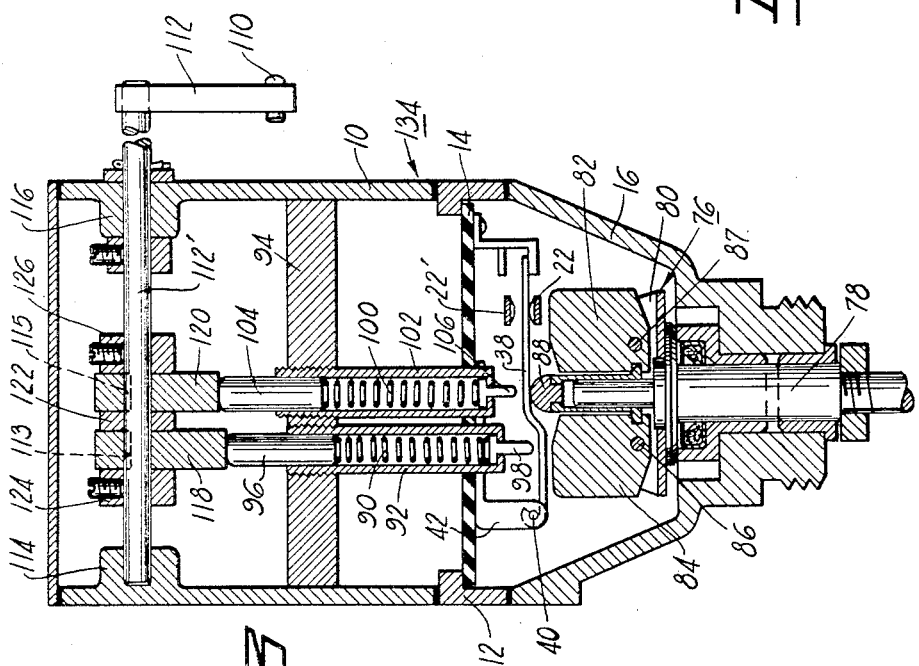

United States Patent Office 2,757,551
Patented Aug. 7, 1956

2,757,551

TRANSMISSION CONTROL AND SWITCH MECHANISM THEREFOR

Richard H. Long, South Bend, Ind., assignor to Bendix Aviation Corporation, South Bend, Ind., a corporation of Delaware Application March 19, 1954, Serial No. 417,441

8 Claims. (Cl. 74—472)

This invention relates to switch mechanisms suitable for use as a control unit for automotive transmissions of an automotive vehicle.

My invention relates to a governor actuated contact making and breaking switch mechanism designed for use in the power plant of an automotive vehicle or in connection with any device or mechanism where it is desired to coordinate a control device with the torque of a prime mover and the speed of a moving part; for example, the switch mechanism of my invention may be employed to control the change speed transmission of an automotive vehicle said mechanism being operated in accordance with the speed of the vehicle and the position of the accelerator the operation of the latter in large measure determining the torque of the engine of the vehicle.

Various types of governor actuated switches have been designed in an effort to meet the demand for such a device, however, such switches have been open to certain objections such as the inability to accurately respond to the combined effect of the engine torque and the vehicle speed. It is accordingly one of the principal objects of my invention to provide a simple, compact and easily serviced governor operated switch, preferably a snap type of switch, the operation of which is controlled by the speed of the vehicle and the position of the accelerator.

Yet another object of my invention is to provide a transmission controlling governor operated multi-stage snap switch mechanism controlled by the accelerator of an automotive vehicle and a vehicle speed responsive governor of said vehicle. Such a switch mechanism serves, at different vehicle speeds and depending upon the position of the accelerator, to effect different settings of the transmission mechanism. The most important feature of my invention lies in so constructing this mechanism and its controls that the driver of the vehicle may, with a depression of the accelerator past wide open throttle or often called kickdown operation of the accelerator, effect a down shift operation of the transmission.

With such a mechanism the driver may, in his operation of say a three speed forward and reverse transmission, quickly shift the transmission from its high gear setting to its second gear setting thus enabling him to pass a car or facilitate the climbing of a steep grade.

A further object of my invention is to provide a simple accelerator and speed controlled governor operated multi-stage mechanism well adapted as a control for the automatic transmission of an automotive vehicle.

The above and other objects of the invention will appear more fully hereinafter from a consideration of the following description where one embodiment of the invention is illustrated by way of example.

Figure 3 is a sectional view disclosing details of the switch mechanism of my invention said view being taken on the line 3—3 of Figure 2;

Figure 4 is another sectional view disclosing details of the switch mechanism of my invention said view being taken on the line 4—4 of Figure 2.

Figure 1:
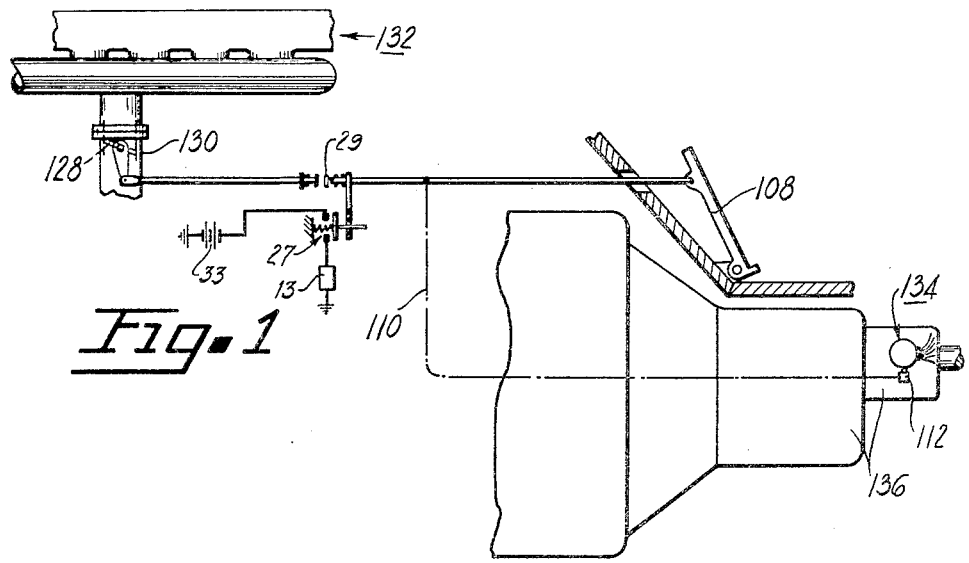
Figure 1 is a diagrammatic view disclosing the switch mechanism of my invention employed as a control means for the change speed transmission mechanism of an automotive vehicle.

My improved governor snap switch mechanism consists of a three part casing the upper section 10 thereof housing the accelerator operated means for controlling the switch mechanism, a central portion 12 thereof supporting, by fastening means 11, a platform 14 of insulating material which acts as a support for the switches of the mechanism; and a lower portion 16 of the casing serves, together with the platform 14 and the portion 12, as a housing for the governor of the switch mechanism.

The switches of the mechanism of my invention are preferably two in number, a single pole double throw switch 18 and a single pole double throw switch 20; however, no claim is made to the switches per se. The switch 20 includes a rectangular shaped actuator 22 one end of which is recessed to receive a tension spring 24. One end of this spring is seated within a recess in a post 25 which is secured, by a conductor pin 26, to a support member 21 of insulating material; and the support member is secured to the platform 14. The other end of the spring 24 is connected to the end of the actuator 22 upon which are mounted movable switch contacts 28 and 30. The actuator 22 operates as a switch operating lever being fulcrumed upon the post 25; and when the actuator is released to the position disclosed in Figure 4 it is operative to move its middle portion below the connection between the spring 24 and the post 25; and this operation results in an operation of the spring 24 to seat the contact 28 upon a fixed switch contact 32. The latter member is secured to a post 29 of electrically conductive material said post being secured to the platform 14 and electrically connected with a switch contact terminal 35 to which is connected a wire 36.

The switch operating actuator 22 is actuated by an actuator arm 38 which is pivotally mounted upon a pin 40; and the latter member is mounted in a support member 42 which is secured to the platform 14. As is disclosed in Figure 4 the actuator arm 38 is biased downwardly to its off position by a first stage operate and release and second stage operate and release spring 43 said spring being housed within a casing 44; and a screw 45 threaded within the upper portion of the casing 44 serves as a means for varying the compression of said spring. When biased downwardly by the spring 43 the actuator arm 38 is moved to the position disclosed in Figure 4, the spring 24 then serving to move the contact 30 into contact with a fixed switch contact 46. The latter contact is secured to a post 48 of electrically conductive material which is secured by a pin 50 of electrically conductive material to a switch contact terminal 52; and a conductor 54, Figure 2, is secured to this terminal 52.

Figure 2:
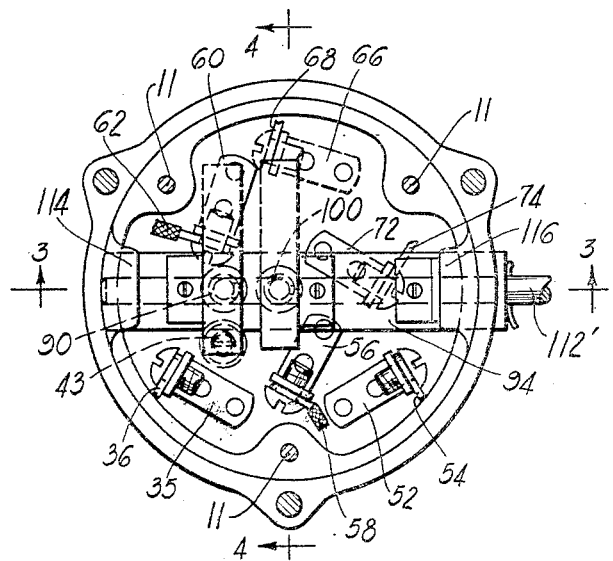
Figure 2 is a top plan view of the switch mechanism of my invention.

Completing the description of the single pole double throw switch 20 a contact terminal 56 is fixed to the pin 26 and a conductor 58, Figure 2, is connected to said terminal. In the released position of the switch 20, Figure 4, the spring 43 serves to effect a closure of the switch 30, 46.

The single pole double throw switch 18 is a duplicate in construction of the switch 20, accordingly, the parts of this switch 18 which duplicate the corresponding parts of the switch 20 are given the same reference numeral with the addition of a prime. In the released position of an actuator arm 22' the parts of the switch 18 assume the position disclosed in Figure 4 a switch 30', 46' being closed.

Completing the description of the switch 18 the fixed contact 32' is secured to a post 59 of electrically conductive material which is electrically connected to a contact terminal 60, Figure 2; and a conductor 62 is secured to said terminal. The fixed contact 46', Figure 4, is secured to a post 64 of electrically conductive material and this post is connected to a contact terminal 66 to which a conductor 68 is secured. The post 25' of the switch 18 is electrically connected, by pin 70, to a contact terminal 72; and a conductor 74 is connected to said terminal.

The actuator arm is moved, to operate the switches 18 and 20, by a vehicle speed responsive centrifugal governor 76. This governor includes a drive shaft 78 journalled within the casing part 16 said shaft having drivably connected thereto a channel shaped plate 80. The shaft 78 is preferably drivably connected to the propeller shaft of the vehicle whereby said shaft is rotated in accordance with the speed of the vehicle. Centrifugal weights 82 and 84 are rotatably mounted on pins 86 and 87 which are mounted in the channel member 80 and said weights when rotated outwardly, Figure 4, serve by means of a thrust pin 88, to rotate the actuator arm 38 upwardly, Figures 3 and 4, to operate the switches 18 and 20. There is thus provided a cubical flyweight type of governor for operating a plurality of single pole double throw switches.

Describing now an important feature of my invention there is provided accelerator operated leverage changing means cooperating with the governor 76, the spring 43, and other springs to be described, for controlling the operation of the switches 18 and 20. As to this feature of the invention one of the objects of my invention is to provide means for operating the switches 18 and 20 in two stages of operation. The first stage of operation serves to open the switch 30, 46 and close the switch 28, 32 of the switch 20, and the second stage of operation of the switch mechanism serves to open the switch 30', 46' and close the switch 28', 32' of the switch 18. To this end there is provided a so-called first stage operate and second stage operate and release spring 90, Figures 3 and 5, mounted within a cup shaped member 92 said member being threadedly mounted within the platform 14 and a support 94 fitted tightly within the casing part 10. The spring 90, which is preferably slightly preloaded in the released position of the accelerator and the released position of the governor 76, is compressed between the lower end of a thrust pin 96 and a thrust pin 98 the latter member being nested in the base of the cup shaped member 92, all as is disclosed in Figure 3.

Figure 5:
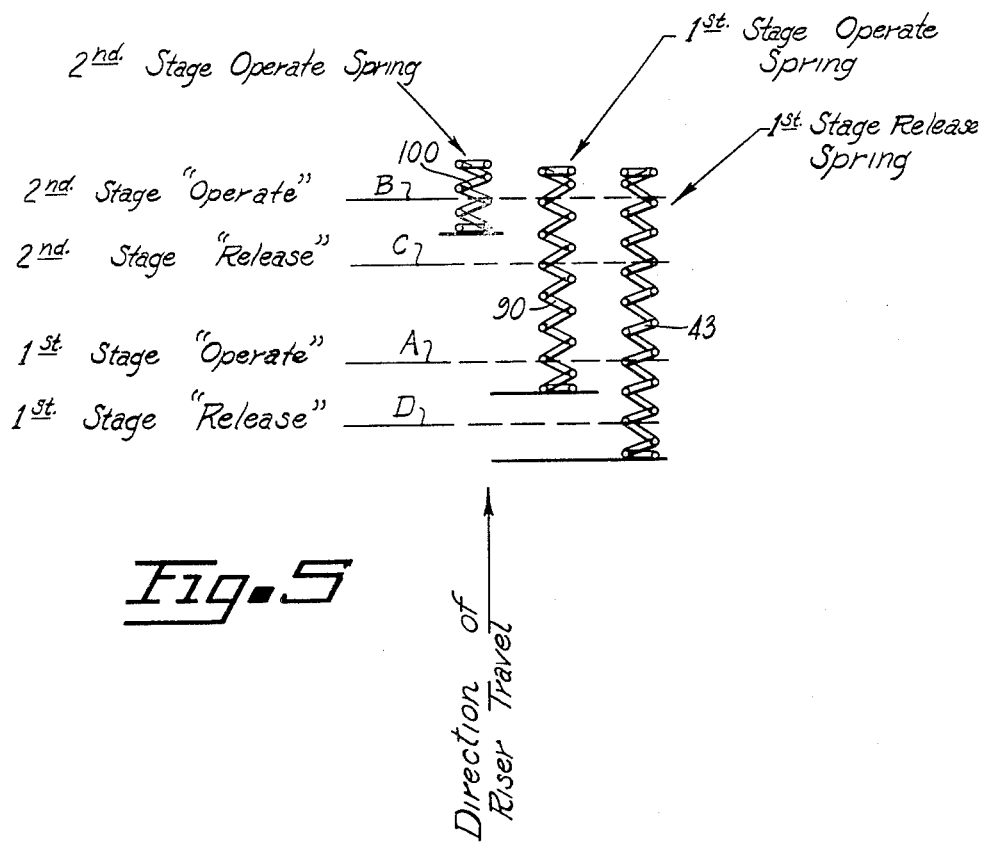
Figure 5 is an explanatory view disclosing the switch controlling spring mechanism of the switch mechanism of my invention.

The accelerator operated means for controlling the operation of the switches 18 and 20 also includes a preloaded second stage operating spring 100, Figure 5, preferably housed within a cup shaped member 102 which is threadedly mounted within the members 14 and 94; and this spring 100 is compressed between a thrust pin 104 and a thrust pin 106 nested in the base of the cup shaped member 102. The members 98 and 106 are positioned immediately above the actuator arm 38 and are adapted to be contacted when the latter is moved upwardly by an operation of the governor 76.

The accelerator of the vehicle is indicated by the reference numeral 108, Figure 1, and this member is preferably connected to the pins 96 and 104 by leverage changing means including linkage 110 connected to a crank 112. The latter member is non-rotatably mounted on a shaft 112' journalled in bosses 114 and 116 constituting a part of the casing part 10. Cam members 118 and 120, connected to the shaft 112' by keys 113 and 115, are held against lateral movement by a spacer member 122; and stops 124 and 126 are in contact, respectively, with the cam members 118 and 120.

The accelerator 108 is preferably connected to a throttle valve 128 of the carburetor 130 of an internal combustion engine said engine being indicated by the reference numeral 132; and the governor operated switch unit of my invention, indicated as a whole by the reference numeral 134, may be mounted adjacent a change speed transmission mechanism 136 the four switches of said unit serving to control said mechanism. The switch mechanism of my invention may, for example, control the shifting of an automatic transmission designed to operate in combination with a torque converter, not shown.

Describing now the operation of the torque and speed responsive two stage governor operated switch mechanism of my invention when the accelerator is in its released position and the vehicle is travelling at or below a relatively low speed, say 10 miles per hour, the parts of the mechanism assumes the position disclosed in Figures 3 and 4 of the drawings, and in these positions the switches 30, 46 and 30', 46' are closed and the switches 28, 32 and 28', 32' are open, the actuator arm 38 contacting the actuator 22, Figure 3. At a certain higher speed of the vehicle, say 20 miles per hour, the governor is operative, by means of the operation of the centrifugal weights 82 and 84 and the actuator arm 38, to compress the springs 43 and 90, Figure 5, sufficiently to effect an opening of the switch 30, 46 and the closing of the switch 28, 32 this operation being defined as the first stage operation of the switch mechanism; and in effecting this operation the accelerator operated cam 118, Figure 3, is operated to compress the spring 90 a certain amount.

Diagrammatically disclosed the bases of the springs 43 and 90 are then on the dotted line prolongation of a line A, Figure 5. This first stage operation of the switch mechanism preferably effects an operation of the transmission mechanism 136, Figure 1, to facilitate an increase in the speed of the vehicle.

The driver will then probably continue the depression of the accelerator 108 thereby increasing the speed of the engine 132; and this operation will probably result in an increase in the speed of the vehicle. Now when this speed reaches a certain factor, say 55 M. P. H., the governor is operative, through the intermediary of actuator arm 38, to compress the spring 100 sufficiently to effect an opening of the switch 30', 46' and a closing of the switch 28', 32'; and this operation of the single pole double throw switch 18 is defined as a second stage operation of the switch mechanism of my invention. Diagrammatically disclosed the base of the spring 100 then assumes the position coinciding with the dotted line prolongation of a line B, Figure 5.

It is to be noted that in opening the throttle to effect the aforementioned second stage operation of the mechanism the cam 120 comes into play to increase the loading upon the spring 100; and it is also to be noted that this second stage operation of the switch mechanism will effect another operation of the transmission mechanism 136 to facilitate an increase in the speed of the vehicle.

Describing now the reverse cycle of operations of the switch mechanism of my invention when the load upon the actuator arm 38 is reduced by either a release of the accelerator to reduce the loading on the springs 100 and 90 or by a reduction in the speed of the vehicle to reduce the force exerted by the governor 76, or by a combination of both of these operations; then the actuator arm 38 moves downwardly to its second stage release position; and in this position of the parts the spring 100 is in its fully released position as is disclosed diagrammatically in Figure 5. As disclosed in this figure the bases of the springs 90 and 43 reach a position coinciding with the prolongation with a line C when the second stage release operation of the switch 18 is effected. With this operation of the switch 18 the switch 30', 46' is again made and the switch 28', 32' is again opened there being a resultant operation of the transmission 136 to return the same to its previous setting.

Completing the description of the operation of the mechanism of my invention a subsequent further release of the accelerator or decrease in the speed of the vehicle, or a combination of these operations, will result in a first stage release operation of the switch 20 to again close the switch 30, 46 and open the switch 28, 32; and with this operation the springs 90 and 43 are expanded to the position diagrammatically disclosed in Figure 5. As is disclosed in this figure the spring 90 is then fully expanded; and this figure will also make it clear that the spring 43 effects the first stage release operation of the switch 20 when said spring reaches a certain position, that is a position indicated by a dotted line prolongation of letter D. The transmission is, by this operation, returned to its first setting.

Describing now the most important feature of my invention there is provided means, operative at the will of the driver through the medium of the accelerator 108 as a control, for shifting the transmission from its aforementioned second stage, that is its highest setting, to its first stage that is intermediate setting. If the transmission being operated is a three speeds forward and reverse or step type transmission the operation now being described effects a shift from high gear to second gear. This mechanism, as disclosed in Figure 4, includes a solenoid or equivalent electromagnet 13 secured to the platform 14, said solenoid comprising a coil 15 and an armature 17 the latter having secured to its lower end a flange 19. When the solenoid 13 is energized the armature 17 is moved upwardly the flange 19 coming into contact with the underside of the end portion of the actuator 22'; and this operation serves to move said actuator to close the switch 38', 46'. When the solenoid 13 is deenergized a spring 23 serves to move the armature downwardly, Figure 4, to clear the actuator 22'.

The solenoid 13 is controlled by a normally open switch 27, Figure 1, so positioned adjacent the accelerator operated throttle operating linkage as to be closed when the accelerator is depressed beyond its normal throttle opening positions. In other words the switch 27 is closed when the accelerator is depressed beyond its wide open throttle position a spring 29 in the connection between the accelerator and throttle facilitating this operation. As is disclosed in Figure 1 the switch 27 is preferably electrically connected in series with a grounded battery 33 and the coil 15 of the solenoid, said coil being grounded. When the driver of vehicle desires to overrule the normal transmission step down operation of the mechanism in order to, say, expedite the passing of a car on the road, he will depress the accelerator sufficiently to close the switch 27 thereby energizing the solenoid 13; and this operation serves to open the switch 28', 32' thereby immediately effecting the second gear setting of the transmission.

Referring particularly to Figure 5 of the drawings it is to be noted that the second stage that is high gear switch operating load on the actuator arm 38 is controlled by the three springs 43, 90 and 100 whereas the second stage release, that is the shift from high to second is controlled by only two springs, that is the springs 43 and 90. This results in a wide differential between the operate and release operations of the switch mechanism. With a normal operation of the mechanism at a substantial opening of the governor operation, at a substantial opening of the throttle, results in an upshift at say 55 M. P. H. vehicle speed; and a downshift at say 20 M. P. H. vehicle speed. However with the addition of the solenoid 13 to the mechanism the driver may, at will, effect a downshift operation or often called kickdown operation, at say a vehicle speed of 45 M. P. H.; and this is done by a depression of the accelerator sufficiently to close the switch 27.

There is thus provided, by the switch mechanism of my invention, a simple, compact and easily serviced accelerator and speed responsive switch mechanism well adapted as a control means for the transmission mechanism of an automotive vehicle. Reference is made to the switch mechanism as being speed and accelerator torque responsive inasmuch as the position of the accelerator in large measure controls the speed of the engine; and the torque of the latter is proportional to its speed. With the mechanism of my invention the two upshift and two downshift stages of operation of the switch 134 are effected both by the control of the position of the accelerator and the speed of the vehicle. For example, for a given position of the accelerator both the upshift stages of operation of the switch may be effected provided the vehicle speed is sufficiently increased; however, for the most part the first stage upshift operation of the switch is effected by one throttle opening setting of the accelerator accompanied by an operation of the governor 76; and the second stage upshift operation of the switch is effected by another throttle opening of the accelerator accompanied by another operation of the said governor. With the switch mechanism of my invention the timing of operation thereof for a given setting of the accelerator, or a given speed of the vehicle, or both, may be varied by adjusting the loading of the springs 90 and 100 or by changing the position of the cams 118 and 120; and with the switch mechanism of my invention the driver may, at will, effect a kickdown that is high to second gear operation of the transmission at speeds greater than the normal downshift speed of say 20 M. P. H.

Although only one embodiment of the invention has been illustrated and described various changes in the form and relative arrangements of the parts may be made to suit requirements.

I claim:

1. In an automotive vehicle including an accelerator and a change speed transmission mechanism, means for controlling the operation of the transmission mechanism including a switch mechanism comprising a plurality of switches, means for controlling the operation of said switches including an electrically operated member and an actuator member, and means for controlling the actuator member and the electrically operated member in their operation of effecting an operation of the switch mechanism including a vehicle speed responsive governor, means for opposing the operation of the governor in its operation of moving the actuator member, and means including spring means, controlled by the position of the accelerator, for controlling the operation of the latter means and the electrically operated member.

2. In an automotive vehicle including an accelerator and a change speed transmission mechanism, means for controlling the operation of the transmission mechanism including a switch mechanism comprising a plurality of single pole double throw switches, means for controlling the operation of said switches including an electrically operated member and an actuator member, and means for controlling the actuator member and the electrically operated member in their operation of effecting an operation of said switch mechanism including a vehicle speed responsive governor, yieldable meanse for opposing the operation of the governor, and means, including a plurality of cam members controlled by the position of the accelerator, for controlling the operation of a part of the latter means.

3. In an automotive vehicle including an accelerator and a change speed transmission mechanism, means for controlling the operation of the transmission mechanism including a switch mechanism comprising a plurality of single pole double throw switches, an actuator member and a solenoid for controlling the operation of said switches, means, including an accelerator operated switch for controlling the operation of the solenoid, and means for controlling the actuator member in its operation of effecting an operation of the switch mechanism including a vehicle speed responsive governor, yieldable means for opposing the movement of the actuator member, and means, including a plurality of cam members controlled by the position of the accelerator, for controlling the operation of the latter means.

4. In an automotive vehicle provided with an internal combustion engine comprising a carburetor said carburetor including a throttle valve, an accelerator for operating the throttle valve to thereby, in a measure, control the torque of the engine, drive wheels, means interconnecting the drive wheels and engine including a change speed transmission mechanism, means for controlling the operation of the latter mechanism including a switch mechanism comprising a plurality of switches, an actuator member for, in part, controlling the operation of said switches and a solenoid for, in part, controlling the operation of one of said switches, and means for controlling the solenoid and the actuator member in their operation of effecting an operation of the switch mechanism including an accelerator operated switch for controlling the operation of the solenoid and further including a vehicle speed responsive governor operable upon the actuator member, means for opposing the operation of the governor, and means, including a plurality of cam members controlled by the position of the accelerator, for controlling the operation of the latter means.

5. A switch mechanism comprising a casing, a platform mounted within the casing, switch means, including a plurality of switches, mounted on the platform, and means within the casing for operating the switches including a plurality of actuators, an actuator arm contractable with the actuators, a solenoid for actuating one of said actuators said solenoid being mounted on the platform, a centrifugally operated governor for moving the actuator arm in one direction, yieldable means for moving the arm in the opposite direction, together with means for controlling the compression of the yieldable means to thereby control the operation of the switch means.

6. A switch mechanism comprising a casing, a platform mounted within the casing, switch means, including a plurality of single pole double throw switches, mounted on the platform, and means within the casing for operating the switches including a plurality of actuators, an actuator arm contractable with the actuators, a solenoid mounted on the platform for actuating one of the actuators, a centrifugally operated governor for moving the actuator arm in one direction, yieldable means for moving the actuator arm in the opposite direction, together with means for controlling the compression of the yieldable means to thereby control the operation of the switch means.

7. A two stage switch mechanism comprising a casing, two single pole double throw switches mounted within the casing, and means within the casing for actuating one of the two switches and for successively operating both of the switches in two stages of operation said means including a plurality of actuators, an actuator arm contractable with the actuators, and a solenoid for actuating one of the actuators, a centrifugally operated governor for moving the actuator arm in one direction, yieldable means for moving the actuator arm in the opposite direction, together with means for controlling the compression of the yieldable means to thereby control the operation of the switch means.

8. In an automotive vehicle including an accelerator and a change speed transmission mechanism, means for controlling the operation of the transmission mechanism including switch mechanism comprising a plurality of switches, a plurality of switch operating actuators, means for controlling the operation of said switches including an actuator member, means for controling the actuator member in its operation of effecting an operation of the switch mechanism including a vehicle speed responsive governor, means for opposing the operation of the governor in its operation of moving the actuator member, means, controlled by the position of the accelerator, for controlling the operation of the latter means, electromagnetic means operable upon one of the actuators to move the same to one of its switch operating positions, and means, including means actuated by the accelerator and operable at the will of the driver, for energizing the electromagnetic means to effect its overruling operation.

References Cited in the file of this patent
UNITED STATES PATENTS
2,671,352     Long _____ Mar. 9, 1954